United States Patent
Solokl et al.

(10) Patent No.: US 6,173,269 B1
(45) Date of Patent: Jan. 9, 2001

(54) METHOD AND APPARATUS FOR EXECUTING ELECTRONIC COMMERCIAL TRANSACTIONS WITH MINORS

(75) Inventors: Daniel David Solokl, San Jose; Kirk Hoyt Knight, Alameda; Frank Anton Corsini, Tiburon, all of CA (US)

(73) Assignee: Zowi.com, Inc, San Francisco, CA (US)

( * ) Notice: Under 35 U.S.C. 154(b), the term of this patent shall be extended for 0 days.

(21) Appl. No.: 09/288,046

(22) Filed: Apr. 7, 1999

Related U.S. Application Data

(60) Provisional application No. 60/112,852, filed on Dec. 16, 1998.

(51) Int. Cl.[7] .............................. G06F 17/60; G06F 15/00
(52) U.S. Cl. .................................. 705/35; 705/39; 705/42
(58) Field of Search .................................. 705/35, 39, 42, 705/14

(56) References Cited

U.S. PATENT DOCUMENTS

| | | | |
|---|---|---|---|
| 4,270,042 | 5/1981 | Case ........................ | 235/379 |
| 4,694,397 | 9/1987 | Grant et al. ........................ | 364/408 |
| 4,823,264 | 4/1989 | Deming ........................ | 364/408 |
| 5,025,372 | 6/1991 | Burton et al. ........................ | 364/406 |
| 5,220,501 | 6/1993 | Lawlor et al. ........................ | 364/408 |
| 5,243,174 | 9/1993 | Veeneman et al. ........................ | 235/381 |
| 5,453,601 | 9/1995 | Rosen ........................ | 235/379 |
| 5,455,407 | 10/1995 | Rosen ........................ | 235/380 |
| 5,469,497 | * 11/1995 | Pierce et al. ........................ | 379/115 |
| 5,500,514 | 3/1996 | Veeneman et al. ........................ | 235/381 |

(List continued on next page.)

FOREIGN PATENT DOCUMENTS

| | | | |
|---|---|---|---|
| 0 725 376 A2 | 7/1996 | (EP) .............................. | G07F 19/00 |
| 0 737 974 | * 12/1996 | (EP) .............................. | G11B 20/00 |
| 0813173 | 12/1997 | (EP) .............................. | G07F 7/08 |
| 0 854 462 A2 | 7/1998 | (EP) .............................. | G07F 19/00 |
| 2 315351 | 1/1998 | (GB) .............................. | G06F 17/60 |
| WO 98/58345 | 12/1998 | (WO) .............................. | G06K 10/00 |

OTHER PUBLICATIONS

Kingson Bloom, Jennifer; "Can a French Payment Architecture Translate?", The American Banker, pp. 3–5, Aug. 19, 1996.*

Cobaltcard, "My Money * My Life * My Card", www.cobaltcard.com, 2 pgs, Jul. 2000.*

(List continued on next page.)

\* cited by examiner

Primary Examiner—Tod R. Swann
Assistant Examiner—James W. Myhre
(74) Attorney, Agent, or Firm—Michael A. Glenn

(57) ABSTRACT

A method and apparatus is provided for executing electronic transactions with teens, especially where such transactions are limited only to those vendors that have been approved by the teen's parents. In one embodiment, a virtual automatic teller machine (VATM) is provided in which funds are transferred from an existing account, such as a saving account, checking account, or credit card account, to an Internet passport account. The VATM account mimics a bank account, i.e. it gives the user the appearance of an ATM machine. Functionally, the VATM allows the user to transfer funds from an existing account into the Internet passport account. The VATM does this by emulating an ATM machine as it appears to the Automated Clearing House (ACH) system. The ACH system is a separate network from the Internet. Rather than acting as a trustee for a teen account, the invention provides a method and apparatus that allows a merchant to withdraw funds directly from the teen's account automatically at the time of purchase. In this way, the invention provides a system in which funds are not held, thereby eliminating cash advance fees and liabilities associated with trusteeship. A second embodiment of the invention, a global gift certificate, is provided. The preferred second embodiment of the invention is configured to appear as a debit card to the ACH system. In this regard, the gift certificate thus generated is truly global in that it is accepted anywhere it is presented.

72 Claims, 3 Drawing Sheets

U.S. PATENT DOCUMENTS

| | | | | |
|---|---|---|---|---|
| 5,513,102 | * | 4/1996 | Auriemma | 705/14 |
| 5,513,117 | | 4/1996 | Small | 364/479 |
| 5,557,518 | | 9/1996 | Rosen | 364/408 |
| 5,636,346 | * | 6/1997 | Saxe | 705/1 |
| 5,642,419 | | 6/1997 | Rosen | 380/23 |
| 5,644,723 | * | 7/1997 | Deaton et al. | 705/14 |
| 5,652,421 | | 7/1997 | Veeneman et al. | 235/381 |
| 5,659,616 | | 8/1997 | Sudia | 380/23 |
| 5,663,547 | | 9/1997 | Ziarno | 235/380 |
| 5,665,952 | | 9/1997 | Ziarno | 235/380 |
| 5,677,955 | | 10/1997 | Doggett et al. | 380/24 |
| 5,696,366 | | 12/1997 | Ziarno | 235/380 |
| 5,708,422 | * | 1/1998 | Blonder et al. | 340/825.34 |
| 5,710,886 | | 1/1998 | Christensen et al. | 395/214 |
| 5,734,838 | * | 3/1998 | Robinson et al. | 705/14 |
| 5,740,247 | | 4/1998 | Violante et al. | 380/24 |
| 5,743,746 | | 4/1998 | Ho et al. | 434/332 |
| 5,758,257 | | 5/1998 | Herz et al. | 455/2 |
| 5,761,648 | * | 6/1998 | Golden et al. | 705/14 |
| 5,765,141 | | 6/1998 | Spector | 705/14 |
| 5,774,868 | * | 6/1998 | Cragun et al. | 705/10 |
| 5,774,870 | | 6/1998 | Storey | 705/14 |
| 5,783,808 | | 7/1998 | Josephson | 235/379 |
| 5,784,439 | | 7/1998 | Nagelmann et al. | 379/91.01 |
| 5,794,210 | | 8/1998 | Goldhaber et al. | 705/14 |
| 5,809,144 | | 9/1998 | Sirbu et al. | 380/25 |
| 5,812,668 | | 9/1998 | Weber | 380/24 |
| 5,815,561 | | 9/1998 | Nguyen et al. | 379/115 |
| 5,816,918 | | 10/1998 | Kelly et al. | 463/16 |
| 5,822,737 | | 10/1998 | Ogram | 705/26 |
| 5,826,244 | | 10/1998 | Huberman | 705/37 |
| 5,832,457 | * | 11/1998 | O'Brien et al. | 705/14 |
| 5,870,724 | * | 2/1999 | Lawlor et al. | 705/42 |
| 5,914,472 | * | 6/1999 | Foladare et al. | 235/380 |
| 5,926,548 | * | 7/1999 | Okamoto | 705/69 |
| 5,930,363 | * | 7/1999 | Stanford et al. | 705/65 |
| 5,953,710 | * | 9/1999 | Fleming | 705/38 |
| 5,970,477 | * | 10/1999 | Roden | 705/32 |
| 6,021,943 | * | 2/2000 | Chastain | 235/379 |
| 6,052,675 | * | 4/2000 | Checchio | 705/44 |
| 6,064,986 | * | 5/2000 | Edelman | 705/36 |

OTHER PUBLICATIONS

DoughNet, "Shop, Bank, Save and Donate", www.doughnet.com, 3 pgs, Jan. 2000.*

ICanBuy, "No Credit card? No worries. Now Teens & Kids Can Shop, Bank & Donate Online", www.icanbuy.com, 38 pgs, Jan. 2000.*

RocketCash, "Use Your Cash Online", www.rocketcash.com, 9 pgs, Jan. 2000.*

Wells, Libby, "Give the Kid Some Credit", aolpf.marketwatch.com, 6 pgs, Jul. 2000.

METHOD AND APPARATUS FOR EXECUTING ELECTRONIC COMMERCIAL TRANSACTIONS WITH MINORS

CROSS-REFERENCE TO RELATED APPLICATION

This is a continuation of U.S. Provisional Application No. 60/112,852, filed Dec. 16, 1998.

BACKGROUND OF THE INVENTION

1. Technical Field

The invention relates to electronic commerce. More particularly, the invention relates to a method and apparatus for executing electronic commercial transactions with minors.

2. Description of the Prior Art

Electronic commerce is one of the most important aspects of the Internet. It allows people to exchange goods and services immediately and with no barriers of time or distance. Any time of the day or night, one can go online and buy almost anything one wants.

The demographics of the Internet have changed gradually over the past couple of years. As the total number of net users grows, their demographic profile becomes more similar to that of the average American. Core demographics—such as age, gender and income—are beginning to stabilize, more closely mirroring the population at large.

eStats estimates that 65% of current net users have used the Web to "shop around" online. Shopping as used herein is defined as checking out products and services and comparing prices, prior to a purchase decision. However, only 14% of net users have actually purchased anything online. Fewer still have used their credit card. This is expected to change drastically in the future.

Marketers sold about $9.5 billion worth of consumer goods over the net last year (1998), and it is projected that that figure will more than double to over $20 billion by the end of this year (1999).

While adults are able to complete commercial transactions over the Internet, minors, e.g. teens, are not able to enter into the binding contracts which form the basis of E-commerce. This is a significant factor in the growth and success of E-commerce because this year, teen spending for ages 12 to 19 will increase 16% to an estimated $141 billion, according to Teenage Research Unlimited Inc. Of that amount, $94 billion is their own money and $47 billion belongs to their parents. Teens get money from other sources as well, such as grandparents, odd jobs, and gifts.

Not only do teens have more money and greater influence over household purchases, but there are more of them. Last year, there were approximately 36 million teenagers, with the number projected to increase to nearly 40 million by 2005, according to the 1990 U.S. Census. If the parameters are broadened slightly, the estimate for the 10-to-24-year-old population group increases from 56 million this year to nearly 62 million in 2005.

Table A below shows teen income by age group.

TABLE A

Teen Income By Age Group

| AGE | INCOME |
|---|---|
| 12–15 | $32 |
| 16–17 | 95 |
| 18–19 | 151 |

Source: Teenage Research Unlimited

Table B below shows where teens get their money.

TABLE B

Where Teens Get Their Money

| | |
|---|---|
| As needed from parents | 55%(*) |
| Odd jobs | 47 |
| Gifts | 44 |
| Part-time job | 30 |
| Allowance | 28 |
| Full-time job | 12 |
| Own business | 2 |
| Other | 17 |

(*)Respondents were allowed more than one answer.
Source: Teenage Research Unlimited Inc.

Table C below shows the share of teen spending by category.

TABLE C

Share of Teen Spending By Category (1996)

| | |
|---|---|
| Clothing | 34% |
| Entertainment | 21.7% |
| Food | 15.5% |
| Other | 10.7% |
| Personal Care | 8.5% |
| Sporting Goods & Apparel | 6.5% |
| Reading Materials | 3.4% |

Chart Courtesy react Magazine

Thus, while teens account for a significant portion of consumer purchases in several categories, they are literally shut out of E-commerce due to legal limitations on their ability to enter into binding contracts, as discussed above. In connection with teen purchases, it has been found that 22% of high school juniors have access to a credit card, 11% to a bank card, and 13.5% to a department store credit card. However, such access is to a parent's card. There are presently no such cards for teens in their own right. This lack of credit impedes the ability of teens to enter into transactions on the Internet, especially because all Internet commercial transaction involve credit of some sort. That is, it is not possible to use cash over the Internet and all commerce requires either a debit transaction (e.g. point-of-sale, i.e. ATM) or credit transaction (e.g. VISA or MasterCard). Yet, the Internet is well suited for teen shopping habits, e.g. clothing and entertainment products/services are readily available on the Internet.

Another issue affecting teen E-commerce involves the availability of literally anything on the Internet and the natural concerns of parents that their children not have access to immoral, dangerous, or otherwise objectionable products and services.

It would be advantageous to provide a method and apparatus for executing electronic transactions with teens, especially where such transactions could be limited only to those vendors or categories of vendors that have been approved by the teen's parents.

SUMMARY OF THE INVENTION

The invention provides a method and apparatus for executing electronic transactions with teens, especially where such transactions are limited only to those vendors that have been approved by the teen's parents.

In one embodiment, a virtual automatic teller machine (VATM) is provided in which funds are transferred from an existing account, such as a saving account, checking account, or credit card account, to an Internet passport account. The VATM account mimics a bank account, i.e. it gives the user the appearance of an ATM machine.

Functionally, the VATM allows the user to transfer funds from an existing account into the Internet passport account. The VATM does this by emulating an ATM machine as it appears to the Automated Clearing House (ACH) system. The ACH system is a separate network from the Internet. Rather than acting as a trustee for a teen account, the invention provides a system that authorizes a merchant to withdraw funds from the teen's account. In this way, the invention provides a system in which funds are not held, thereby eliminating cash advance fees and liabilities associated with trusteeship.

A second embodiment of the invention, a global gift certificate, is provided. The preferred second embodiment of the invention is configured to appear as a debit card to the ACH system. In this regard, the gift certificate thus generated is truly global in that it is accepted anywhere it is presented. The ability of the system to deny authorization of the merchant's request for payment provides the control mechanism.

A third embodiment of the invention is configured to appear as a global credit card to the credit system. This method might be preferable for the occasional merchant which does not have the ability to accept forms of electronic payment other than credit cards. Again, the ability of the system to deny authorization of the merchant's request for payment provides the control mechanism.

DETAILED DESCRIPTION OF THE INVENTION

The invention provides a method and apparatus for executing electronic transactions with minors, e.g. teens, especially where such transactions are limited only to those vendors that have been approved by the teen's parents.

Figure 1:
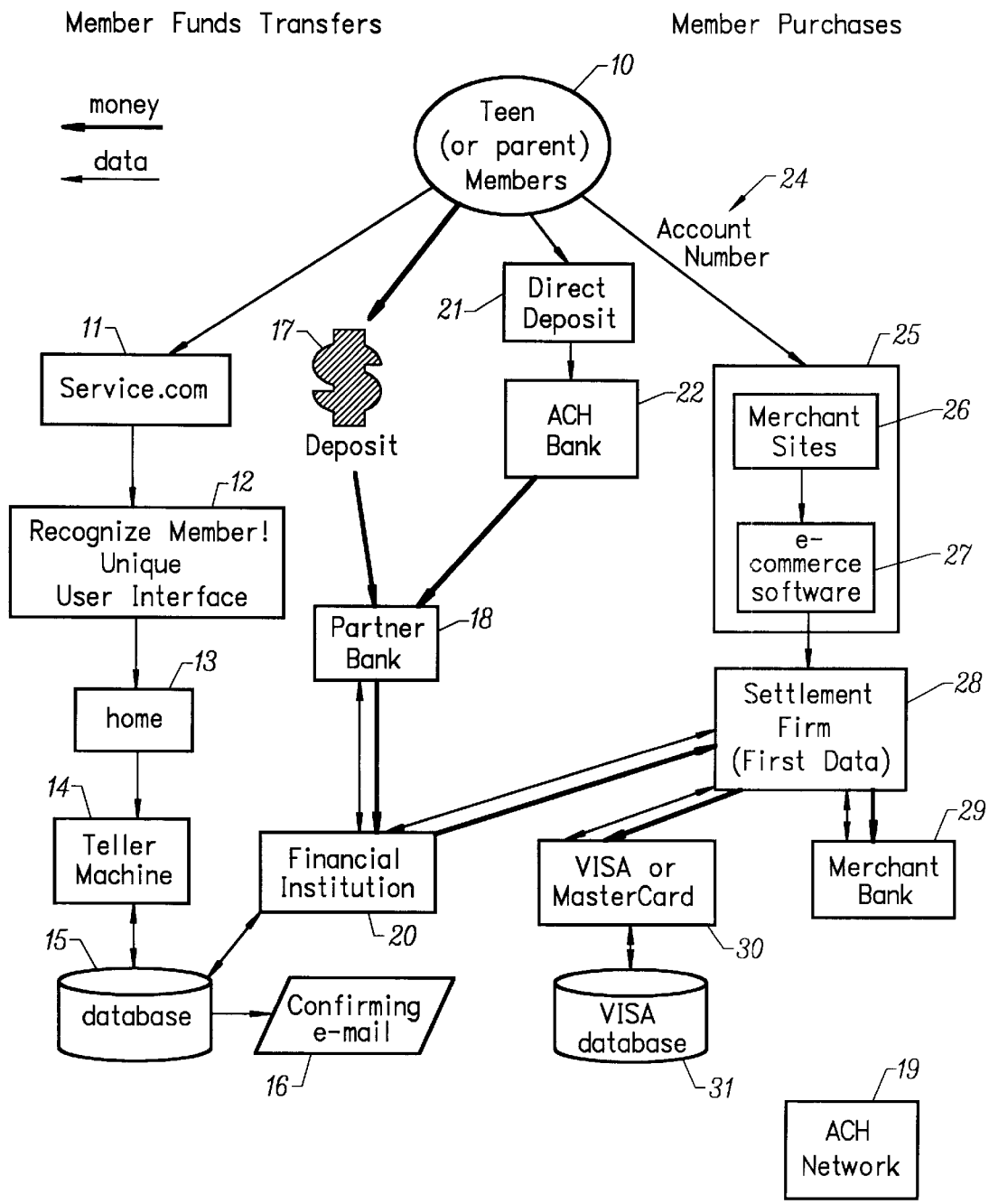
FIG. 1 is a block schematic diagram of an apparatus for executing electronic commercial transactions with teens according to the invention.

FIG. 1 is a block schematic diagram of an apparatus for executing electronic commercial transactions with teens according to the invention. Teens and their parents or other responsible adults are members of a service that allows teens to complete commercial transactions with merchants over an electronic network, such as the Internet. In FIG. 1, operation of the invention is shown with member fund transfers appearing on the left hand side of FIG. 1 and member purchases appearing on the right hand side of FIG. 1. For purposes of the discussion herein, member funds transfers involve those transactions that are necessary to fund the member account (i.e. the teen's account) and those transactions that are necessary to settle accounts with on-line merchants pursuant to a purchase, while member purchases are those transactions that occur between the teen member and an on-line merchant. Further, the flow of funds in FIG. 1 is indicated by a thick line, while the flow of information in FIG. 1 is indicated by a narrow line.

Before a teen (or parent, as explained below) 10 can enter into a transaction with a merchant using the invention, it is first necessary that an account be established with the service. Thus, the teen or parent contacts the service Web site, in this case service.com 11, for example using a personal computer, such as an Apple Macintosh, that is running a browser program, such as Netscape Navigator. The system recognizes either that a member is accessing the service, or the teen (or parent) may enter into a dialog to establish membership 12 with the service. The teen is then directed to the service home page 13, from which he may access his account, e.g. the teller machine 14. A database 15 at the service site maintains a record of all members and transactions. In some embodiments of the invention, the database may also maintain user account totals and balances, although it is not necessary to maintain this information (as discussed below). User transactions at the service are confirmed with the user via email 18.

To use an account, funds must be available to the teen. These funds are placed into the account in any of various ways. FIG. 1 shows a cash deposit 17 to a service partner bank 18 or a direct deposit 21 to the service partner bank through an ACH bank 22 using the ACH network 19.

In one embodiment, a virtual automatic teller machine (VATM) is provided in which funds are transferred from an existing account, such as a saving account, checking account, or credit card account, to an Internet passport account. The VATM account mimics a bank account, i.e. it gives the user the appearance of an ATM machine.

Functionally, the VATM allows the user to transfer funds from an existing account into the Internet passport account. The VATM does this by emulating an ATM machine as it appears to the (ACH) system.

The ACH system is a separate network from the Internet. The ACH network is a secure nationwide system that processes electronic payments on behalf of banks, savings and loan associations, and credit unions. The ACH network uses high speed computers and secure telecommunications to transfer funds and payment related information. The Federal Reserve Bank, American Clearing House, New York Clearing House, and VisaNet ACH serve as ACH Operators, processing ACH transactions and information.

Electronic ACH services fall into two broad categories: consumer payments and corporation payments. It is estimated that 80% of all ACH transactions are in the consumer category. Some consumer ACH services include:

Direct Deposit of payroll, dividends, interest, annuities, pension and investment income.

Direct Deposit of Federal Government payments including Social Security benefits.

Payment of insurance premiums, utility bills, mortgage and rental bills, installment loans and contributions.

Electronic debiting through Point-of-Sale (POS) debit cards.

Home banking and telephone bill payment.

As discussed in greater detail below, this embodiment of the invention is readily implemented in cooperation with the ACH network and no additional financial systems need be put in place to practice the invention. Operation of the ACH network is well known to those skilled in the art and well documented. Accordingly, the ACH network is not discussed herein in any greater detail. Those desiring additional information about the ACH network can contact the National Automated Clearing House Association, 13665 Dulles Technology Drive, Suite 300 Herndon, VA 20171.

Because the invention uses both the Internet for initiating transactions with merchants and the ACH network for settling these transactions, it is not necessary to add any special software or hardware to either system to implement the invention. Further, the user only needs a browser and personal computer having a modem, and an account with an Internet service provider, to access the service. Merchants themselves need not modify their Web sites (although a contractual relationship between the merchant and the service may be required in some embodiments of the invention, e.g. where a credit card is used for settlement under current practices). In fact, merchants need not be aware that they are transacting business with anyone other than a person using a typical on-line transaction technique. Thus, the invention is readily implemented in existing systems with existing technology by those skilled in the art. It is only necessary to provide the service and to set up the banking relationships described herein to practice the invention. The software required to run the service site may be readily implemented by those skilled in the art in accordance with the discussion herein.

In the case of a direct deposit, a legally responsible party, for example the teen's parent, authorizes an existing bank or other financial institution to make transactions to the checking, savings, or credit/debit card accounts of either the teen, the parent, or an approved adult, such as a family friend or relative. These accounts may be in any bank or other financial institution, including a service partner bank. To authorize direct deposits to the service, the responsible party maintains an account and agrees that the service partner bank may receive such funds. The mechanics of direct deposit transactions vis-a-vis the ACH network are well known to those skilled in the art. Alternative embodiments of the invention, discussed herein, are provided for point of sale (POS) transactions using the ATM system.

Once funds are available in the service partner bank, the ACH network 19 makes such funds available to the service financial institution 20, and the teen may use his service account to enter into on-line transactions with merchants. To do so, the teen provides the service with a valid account number 24 and then has access to those merchant sites 26 within the service system 25 which, as noted earlier, can be a single merchant, selected merchants, or include all merchants.

Merchant sites may be selected by the teen from either a list of approved teen sites, i.e. age and content appropriate, or the teen may be given unrestricted access to to all sites on the Internet, if approved by his parents, and if the service allows unrestricted access. An important feature of the invention is the ability of the parent to accept a service approved list of appropriate merchants, appropriate merchant categories, or to specify a parent approved merchant profile, for example during the sign up process (or as updated by the parent from time to time using a parent's supervisory access password). This aspect of the invention allows a parent to control those items to which a teen has access. The use of the service also prevents the sale of illicit items, such as liquor, non-prescription drugs, or pornography, to teens. The service can inspect a merchant site before it is added to the service's approved list and thereby prevent teen access to undesirable sites or specific products/services on otherwise approved sites. For example, the teen may have access to Amazon.com, but may not purchase any recordings by the Beastie Boys. The service can also intercept a transaction and prevent a sale from proceeding if a particular class of goods is being purchased (as identified, for example, by a key word scan of the teen's purchase order prior to approval). Thus, the service provides both advance sale notification of illicit sales to minors by merchants and post sale notification of illicit sales to minors by merchants.

The service can enable placing an order before the release of a product, event or service. This capability is likely to be desired for popular fad items or tickets to popular events.

The service interacts with E-commerce software 27 at the merchant site that enables the teen to enter into transactions with merchants on-line in a manner that is legally binding. This is best understood with reference to FIG. 1 in which a bank account is established at the service partner bank. Using the ACH network, the service provides the merchant with valid account information, e.g. via the service's financial institution 20, which the merchant can access pursuant to a transaction with a teen member of the service. The merchant uses their settlement firm 28 to access this account via the ACH network 19 and funds are then transferred to the merchant's bank 29. All transfers of funds and transactions affecting the teen's account are reconciled and reported to the teen and/or his parent by the service, for example by email or by regular statements. Thus, the system is a closed loop process in which all teen transactions are readily reconciled and reported. If so desired, this allows the teen's parent a certain level of supervision over the teen's use of the account, for example when regular statements of account are sent to the teen's parents, either by email or by the U.S. postal service (or other surface mail delivery system).

Alternatively, the service may provide credit card information to the merchant, e.g. a VISA or MasterCard 30, which is then settled within the credit card company's system 31. In such embodiment of the invention, it may be necessary under current practices for the merchant to have a contractual relationship with the service. One advantage of this embodiment of the invention is that credit cards are universally accepted and the protection can be applied prior to providing the purchase authorization code to the merchant for the transaction. Accordingly, the service may be used universally.

Referring again to FIG. 1, it is important to note that the service itself does not have custody of the funds within the teen's account. This is best seen on FIG. 1 by following the flow of money, indicated by the thick line. However, the service provides access to the teen's account for authorized purchases. In this way, the service supervises the teen's use of their account as a surrogate for the teen's parent. Further, approval for such purchases is provided by the service, which has the legal capacity to enter into contracts, and therefore enable a legally binding transaction to be entered into between the merchant and the teen, i.e. where the service is the contracting party.

As discussed above, the service maintains a database of service members, as well as member profiles that include such information as spending limits per transaction, types of products that may be purchased, and sources of funds. The service may rely upon a cooperating financial institution 20 to maintain teen account balances. In such case, the service authorizes transactions on behalf of a teen after verifying that funds are available in the teen's account. In an alternative embodiment of the invention, the service may maintain records of account balances and authorize transactions based upon such local information.

The database also allows the service to maintain funds in a single account for all teens who use the service. In this embodiment of the invention, the funds of each user are commingled in a single account at the financial institution, but access to the funds is segregated based on fund ownership records maintained in the service database. In this way, the service provides each teen user with the appearance of a separate account, complete with a unique account number and pass word, yet the funds are not maintained in separate account in the financial institution. This simplifies the complexity of the underlying system needed to support the service. Transaction accounting at the service, such that individual account totals are properly credited, debited, and reported, is readily provided using known accounting techniques and readily available accounting software.

The database may also be used to collect information about the user, such as his purchase preferences, spending habits, dates of significance, such as birthdays, and other relevant information. This information may be used by the teen with an on-line agent to assist the teen in finding desired merchandize and services. The information may also be used to provide market information with regard to teen preferences and spending patterns. However, the invention readily protects teen privacy by preventing the pass-through of any such information without first receiving authorization for the release of the information from the teen and/or his parents.

The invention also provides an optional pass-through remailer that directs all products ordered from merchants by teens to the service itself, which then forwards such packages to the intended recipient. In this way, the teen's address and identity remain anonymous.

In the preferred embodiment of the invention, rather than acting as a trustee for a teen account, the invention provides a method and apparatus that allows a merchant to withdraw funds directly from the teen's account automatically at the time of purchase. While the invention provides the teen with access to various on-line merchants, the invention avoids creating a trusteeship of the teen's funds because the service never holds such funds, yet enables legally binding transactions between the teen and the merchant because the service authorizes the transaction and the transaction crosses the service's system. In this way, the invention provides a system in which funds are not held, thereby eliminating cash advance fees and liabilities associated with trusteeship.

In one embodiment, the preferred embodiment of the invention does not use four digit ATM personal identification numbers (PINs) as a bank does for enabling ATM transactions. Rather, the invention preferably uses a pass phrase, e.g. "My dog likes cheese." The pass phrase is used to lookup a four digit PIN number in the service database which is then sent to the bank via the ATM system. The user does not have direct access to the four digit PIN number. In this way, security of the system is enhanced.

Figure 2:
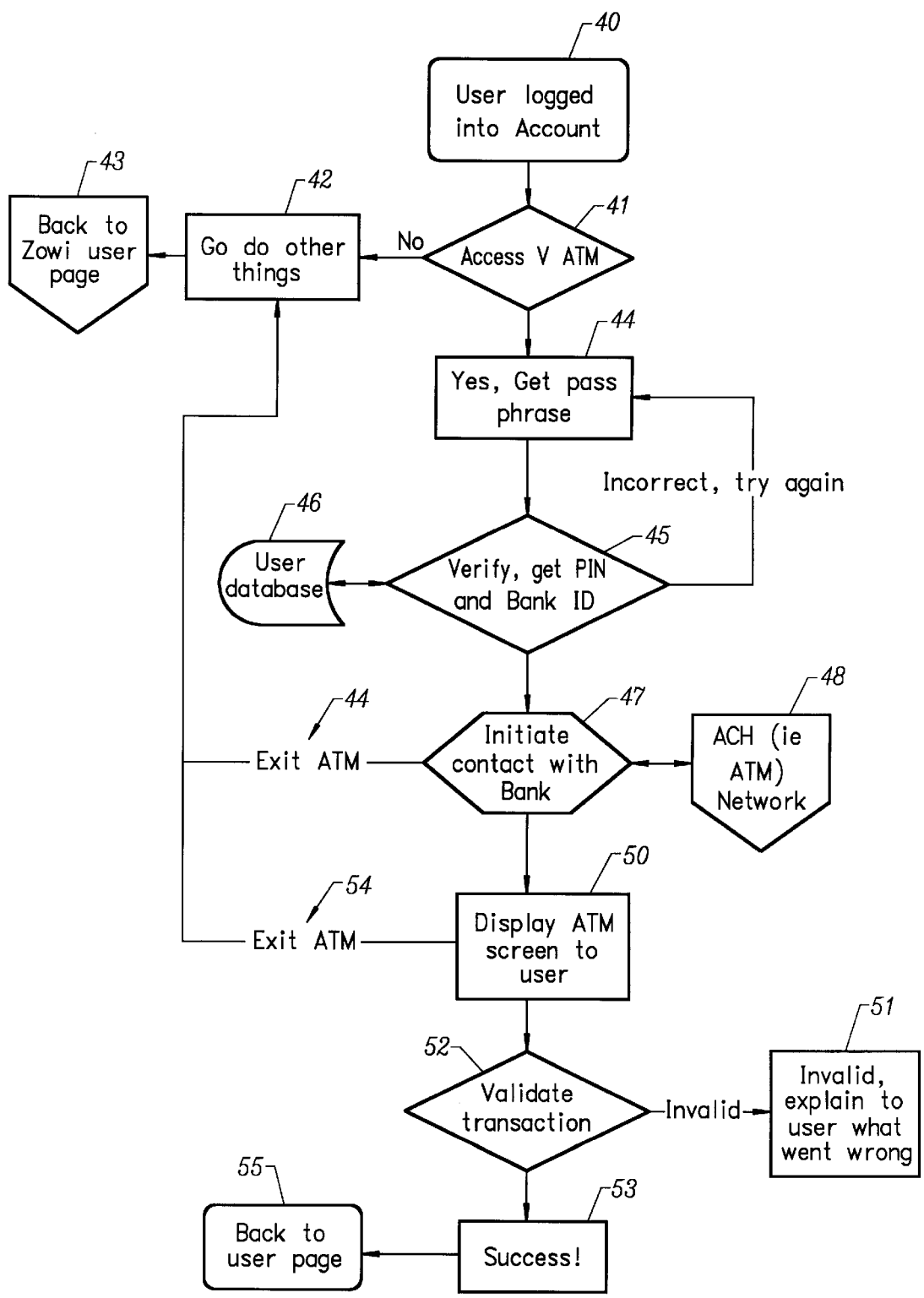
FIG. 2 is a flow diagram showing the operation of a virtual automatic teller machine (VATM) to execute e electronic commercial transact ions with teens according to the invention.

FIG. 2 is a flow diagram showing the operation of a virtual automatic teller machine (VATM) to execute electronic commercial transactions with teens according to the invention. The VATM provides an account that appears to be a standard bank account for purposes of a transaction, such that an ATM-type exchange may occur. When a teen is logged into his service account 40 he may access the VATM 41 or do other activities 42, such as read about special offers, check on bonuses, or reconfigure his profile. At the completion of such activities, the teen returns to the user page 43 of the service.

If the teen is accessing his VATM account 41, he first enters his pass phrase 44 which is verified 45 by checking the user database 46. The pass phrase is converted to a standard four digit PIN and the service initiates contact with the service financial institution 47 via the ACH network 48. If contact cannot be initiated, the ATM is exited 49. Otherwise, the ATM screen is displayed to the teen 50 and the teen may proceed with a transaction, such as balance inquiry or making a purchase.

At this point, the service may exit the ATM 54 if the transaction cannot be validated 52, for example because insufficient funds were available 51. If the transaction is validated successfully 53, then the purchase is concluded and the teen is returned to the service user page 55.

A second embodiment of the invention, a global gift certificate, is provided. In the prior art, a gift certificate is typically limited to a store, a chain of stores, or a mall (electronic or otherwise; see, for example, W. Veeneman, T. Doyle, K. Alexander, R. Hamilton, *Method and Apparatus For Generating Gift Certificates*, U.S. Pat. No. 5, 243, 174 (Sep. 7 1993); W. Veeneman, K. Alexander, P. Brooks, T. Doyle, R. Hamilton, *Method and Apparatus For Generating Gift Certificates*, U.S. Pat. No. 5,652,421 (Jul. 29 1997); and W. Veeneman, K. Alexander, P. Brooks, T. Doyle, R. Hamilton, *Method and Apparatus For Generating Gift Certificates*, U.S. Pat. No. 5,500,514 (Mar.19, 1996).

The preferred second embodiment of the invention is configured to appear as a debit card to the ACH system. In this regard, the gift certificate thus generated is truly global in that it is accepted anywhere it is presented.

Figure 3:
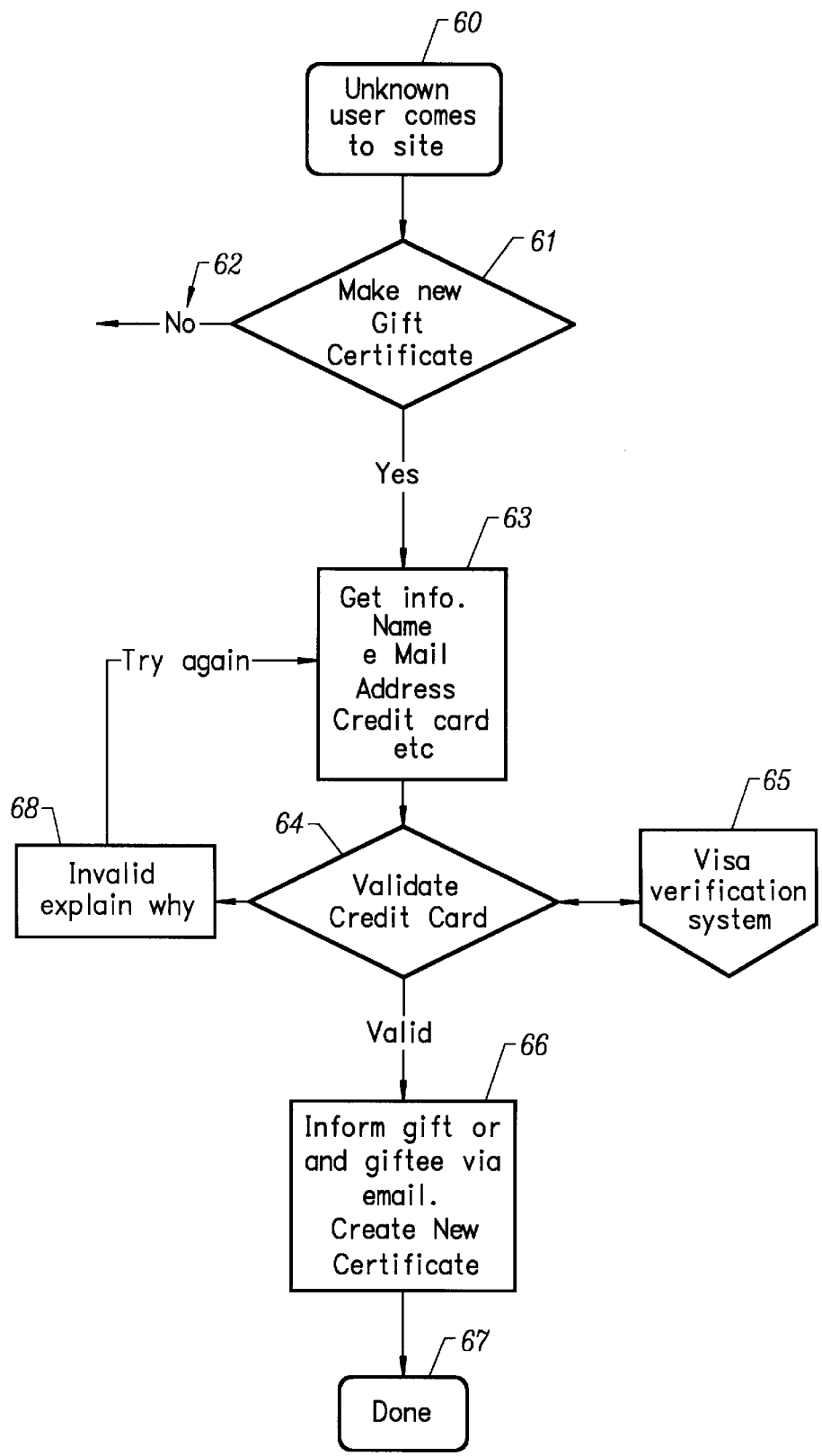
FIG. 3 is a flow diagram of a process for creating a gift certificate according to the invention.

FIG. 3 is a flow diagram of a process for creating a gift certificate according to the invention. It should be appreciated that the gift certificate is a universal gift certificate that may be given to anyone by anyone and need not be limited to teen recipients. An unknown user, such as a grandparent, or uncle visits the service site 60. The user has the option of making a gift certificate 61 or engaging in other activities 62. If the user wants to make a gift certificate, the user enters into a dialog in which a form, such as an HTML form, may be filled out 63 containing such information as the user's name, email address, and credit card number, as well as the recipient's name and service account number (if the recipient has an account with the service). Alternatively, the user may establish a gift account for the recipient. The service validates the credit card 64 using a credit card verification system 65. If the card is invalid 68, the service provides information to the user regarding such invalidity. If the card is valid, the service informs the recipient of the gift 66 and the process is complete 67. Funds for the gift may be credited to the recipient's account as a credit or they may be transferred directly to the recipient's VATM account.

The Internet passport may be loaded, i.e. receive funds in any of several ways, some of which have been discussed above. Funds may be loaded into the teen's account by transferring the funds from the user's bank account. This account can be a parent's account and funds may be regularly transferred into the account, i.e. in the form of a periodic allowance. The funds may be transferred from a custodial account upon parental authorization. The funds may be transferred from a credit card or debit card on a periodic basis, i.e. as allowance, or on a one time basis, i.e. as a gift.

In one preferred embodiment of the invention, the teen's account is typically used in commerce as if it were a debit card. Thus, the service provides a certificate that uses the same sixteen numbers as a credit/debit card. The certificate numbers are issued through the service financial institution. When the teen makes a purchase, he enters his certificate number into the E-commerce shopping cart check out form as if it were a standard debit card. The transaction is reconciled as described above.

In the presently preferred embodiment of the invention, the service screens merchants to maintain a list of approved merchants that are known to be reputable and that are known to carry only merchandize and services that is appropriate for teens. The service may provide subsets of this list, such as entertainment or clothing, as well as allow the parent's to set a profile for their child. In this latter case, the parent's are issued a separate pass code that provides them with supervisory access to the teen's account.

Permission to use the account is granted to the teen by his parents when establishing the account. Thus, the parents provide the service with authority to execute transactions on behalf of the teen as a surrogate for the parents. Such permission is limited to the scope of goods and services authorized by the parents for the teen's consumption, as well as daily/weekly spending limits, limits on spending per session, and any other restriction on use of the account that the parents may feel appropriate. In this way, each account can be customized. The teens privileges are automatically enforced by the service by matching a desired transaction to the profile established by the teen's parents, as well as a profile that the teen may establish, for example to provide the teen with immediate access to favorite sites, press release, and promotions.

The service also includes bonus and promotional features that reward teen's for purchases and thus build affinity for those merchants which issue such rewards. These rewards may be issued as coupons in real time which are good for immediate discounts on certain merchandize, or they may be other types of rewards, such as for example deferred rewards or cumulative rewards, e.g. buy four DVDs at Amazon.com and get the fifth DVD free. The service, in conjunction with one or more merchants, may provide promotional discounts. Further, the teen may be able to assign his rewards to third parties. For example, he may trade his rewards with his friends or give them as gifts.

From the foregoing, it can be seen that the invention herein provides on-line access for teens to the larger world of commerce that they are used to when they shop in stores. The invention provides a system that is robust and rich in its potential for implementing any such marketing and promotional techniques as are known, including, but not limited to those discussed above.

The invention also provides access to goods and service that would not otherwise be available to teens because E-commerce allows one to shop world wide. Thus, teens may now shop for goods and service not available locally.

They may shop internationally. In this latter case, the teen's account is readily used, based upon simple currency conversions.

Another aspect of the invention allows the teen account to be transferred to the teen upon his reaching his majority. The financial institution that managed the teen's account on behalf of the service retains the teen as an adult customer. In this way, the teen may enter adulthood with established credit and a sense of responsibility for managing his affairs. This is especially true because the account provides a cash basis for transaction and does not allow the teen to become over-extended through the use of credit. The teen must live within his means, i.e. he cannot spend more than the amount of funds available in his account.

While the invention provides a mechanism that enable teen purchases over the Internet, it also provides a financial management tool for the teen. For example, the teen and/or his parents may select an option in his profile that allows a portion of the teen's allowance to be placed into a savings account or into an investment fund. The parent may also require that the teen take online financial courses selected from those provided by the service, prior to releasing funds. The courses would demonstrate the teen's competence to the parent. Thus, there is an element of financial control and planning provided by the invention.

The invention also provides a reverse coupon. The traditional coupon process requires the consumer to possess a coupon prior to making a purchase and then redeeming the coupon on a separate visit, or at the time of the transaction. This feature of the invention allows a merchant or other agency to distribute a physical coupon to a teen during a face-to-face transaction, e.g. at a fast-food restaurant. The coupon is redeemable online for cash or a discount on purchases made at the service by the teen using his service account, or the coupon may be "deposited" to a bank or credit card account. The coupon may alternatively be a contest ticket that requires the teen to log-on to his service account to see if and what he has won. The redemption of the coupon takes place at the service Web site. Each coupon is identified by a number which can be traced back to a specific transaction or merchant, and preferably may only be redeemed once. One use of the coupon is made by food merchants who typically do not transact business over the Internet and further, may only provide for cash transactions.

Such coupon generates a Web presence for this class of merchants. Another use of the coupon is by merchants who want to encourage their customer to engage in E-commerce, e.g. at the merchant's Web site.

By eliminating the need to tabulate paper coupons used for redemption, and further by placing the data entry task on the purchaser rather than the merchant or the manufacturer, and yet further, by employing computerized databases to match the redeemer of the coupon with the product or service indicated by the coupon, the use of the reverse coupon opens many new possible applications to one skilled in the art. One immediate benefit is a reduction from several months to potentially a few minutes in the time from the purchase to reporting back to the manufacturer. Fraud is also reduced by identifying the specific person redeeming the coupon with the location and time of the purchase. Individuals who abuse the coupon system can be instantly identified at the time of redemption. Further, by employing the infrastructure of the service and reducing the amount of handling required the cost of the coupon more closely reflects the value of the coupon.

Although the invention is described herein with reference to the preferred embodiment, one skilled in the art will readily appreciate that other applications may be substituted for those set forth herein without departing from the spirit and scope of the present invention.

For example, while the preferred embodiment of the invention has been described in connection with on-line transactions, it will be appreciated by those skilled in the art that the invention is readily applicable to telephone, fax, and mail based orders, as well as by an in person transaction based upon a service card that is approved by the service during the transaction. Thus, the teen may use his account to purchase items via an 800 number, he may fax an order, he may mail an order to a merchant, or he may present a card bearing his account number to a merchant. Further, the invention herein disclosed may be used by individuals who do not possess credit cards, or those who want the "club benefits" of the service offered by the invention.

Accordingly, the invention should only be limited by the claims included below.

What is claimed is:

1. A method for executing electronic transactions with an individual lacking contractual capacity, comprising the steps of:

funding a separate account held by a financial institution with funds from a fund source account of a parent or guardian of said individual, wherein said separate account is independent and unsupervised relative to said fund source account; and providing a service for supervising access by said individual who is enrolled with said service to funds in said separate account, said service executing binding transactions with third parties on behalf of said individual.

2. The method of claim 1, wherein said service comprises a virtual automatic teller machine (VATM) that emulates an ATM machine as it appears to the POS system.

3. The method of claim 1, said funding step further comprising the step of:

a legally responsible party authorizing said financial institution to make transactions to their checking, savings, or credit/debit card accounts.

4. The method of claim 1, wherein said third parties comprise merchant sites accessible via an electronic network.

5. The method of claim 4, wherein said merchant sites may be accessed by said individual from a list of service approved merchant sites based upon selected factors that may include the individual's age or content of said of said merchant site.

6. The method of claim 4, wherein said merchant sites may be accessed by said individual based upon a merchant profile approved by said individual's parent or guardian.

7. The method of claim 5, wherein service inspects a merchant site before it is added to said service's approved list.

8. The method of claim 4, wherein said service can intercept a transaction and prevent a sale authorizing payment for a transaction from proceeding if a particular product/service or class of products/services is involved in said transaction between said individual and said merchant site.

9. The method of claim 4, wherein said service provides said merchant with valid separate account information; and wherein said merchant can access said separate account pursuant to a transaction with said individual.

10. The method of claim 4, wherein all transfers of funds and all transaction involving said individual are reconciled and reported to said individual and/or said individual's parent or guardian by the service.

11. The method of claim 4, wherein said service provides credit card information to said merchant.

12. The method of claim 4, wherein said service maintains a database of service members, as well as member profiles that may include any of such information as spending limits per transaction, types of products that may be purchased, and sources of funds.

13. The method of claim 4, wherein said service authorizes transactions on behalf of said individual after verifying that funds are available in said separate account.

14. The method of claim 4, further comprising the step of:

providing a database for collecting information about said individual which may include any of said individual's purchase preferences, spending habits, dates of significance, and other relevant information; wherein said information may optionally be used by said individual with an on-line agent to assist said individual in finding desired products and services, or may be used to provide market information with regard to said individual's preferences and spending patterns.

15. The method of claim 4, further comprising the step of:

providing a pass-through remailer that directs all products ordered from merchants by said individual to said service, which then forwards said products to an intended recipient.

16. The method of claim 1, wherein said service does not have custody of any funds within said separate account.

17. The method of claim 1, wherin said service supervises said individual's use of said separate account as a surrogate for said individual's parent of guardian.

18. The method of claim 1, wherein funds of each individual who uses said service are commingled in a single service account at said financial institution; and wherein access to said funds is segregated based on fund ownership records maintained in a service database.

19. A method that allows a merchant to withdraw funds directly from a separate account of an individual lacking contractual capacity automatically at the time of purchase, comprising the steps of:

providing said individual with access to one or more merchants via a service that does not hold any of said individual's funds;

funding a separate account held by a financial institution with funds from a fund source account of a parent or guardian of said individual, wherein said separate account is independent and unsupervised relative to said find source account; and enabling legally binding transactions between said individual and said merchant with said separate account by authorizing transactions between said individual and said merchant on behalf of said individual's parent or guardian.

20. The method of claim 19, further comprising the step of:

providing said individual with a pass phrase that is used to lookup a multiple digit PIN number in a service database.

21. The method of claim 19, wherein said service generates a global gift certificate for use by said individual in concluding one or more transactions with said merchant.

22. The method of claim 21, wherein said gift certificate is a universal gift certificate that may be given to anyone by said individual.

23. The method of claim 19, wherein said funds may either be transferred from said fund source account to said separate account on a periodic basis as an allowance or on a one time basis as a gift.

24. The method of claim 19, wherein said separate account is used as if it were a debit card, wherein said individual enters a certificate number into a form as if it were a standard debit card when said individual makes a purchase from said merchant.

25. The method of claim 19, wherein said service screens merchants to maintain a list of approved merchants that are known to be reputable and that are known to carry only products and services that are appropriate for minors;

wherein said service may optionally provide subsets of said list and allow said individual's parent or guardian to set a profile for said individual, in which case said parent or guardian may be provided with a secure pass code that gives said parent or guardian supervisory access to said individual's account.

26. The method of claim 19, wherein permission to use said separate account is granted to said individual by said individual's parent or guardian when establishing said separate account;

wherein said individual's parent or guardian provides said service with authority to execute and supervise transactions on behalf of said individual.

27. The method of claim 19, wherein said individual's use of said separate account is limited to any of the scope of goods and services authorized by said individual's parent or guardian, a daily/weekly spending limit, maintaining a minimum account balance, or a limit on spending per session.

28. The method of claim 19, wherein said individual's account privileges are automatically enforced by said service by matching a desired transaction to a profile established by said individual's parent or guardian.

29. The method of claim 19, wherein said service provides bonus and promotional features that reward said individual for purchases.

30. The method of claim 29, wherein said rewards may be issued as coupons in real time which are good for immediate discounts on certain merchandise, or they may be promotional discounts;

wherein said individual may optionally assign said rewards to third parties.

31. The method of claim 19, wherein said service, upon authorization, transfers said individual's account to said individual upon said individual reaching majority.

32. The method of claim 19, wherein said service executes transactions between said individual and said merchant on a cash basis and does not allow said individual to become over-extended through the use of credit.

33. The method of claim 19, wherein an option may be set in said individual's profile that allows a portion of said individual's funds to be placed into a savings account, a non-profit donation, or an investment fund.

34. The method of claim 19, further comprising the step of:

providing a coupon that allows a merchant or other agency to distribute a physical coupon to said individual during a face-to-face transaction, wherein said coupon is redeemable for any of cash, funds deposited in said separate account, a deposit to a bank or credit card account, or a discount on purchases made as said service by said individual using said separate account.

35. The method of claim 34, wherein said coupon is a contest ticket that requires said individual to log-on to said service to see if and what said individual has won;

wherein redemption of said coupon takes place at a service site;

wherein each said coupon is optionally identified by a number which can be traced back to a specific transaction or merchant; and wherein said coupon optionally may only be redeemed once.

36. The method of claim 19, wherein said transaction may be concluded between said individual and said merchant via any of telephone, fax, and mail based orders, as well as an in person transaction based upon a service card that is approved by said service.

37. An apparatus for executing electronic transactions with individuals lacking contractual capacity, comprising:

a separate account held by a financial institution, said separate account being funded with funds from a fund source account of a parent of guardian of said individual, wherein said separate account is independent and unsupervised relative to said fund source account; and a service for supervising access by an individual lacking contractual capacity who is enrolled with said service to funds in said separate account, said service executing legally binding transactions with third parties on behalf of said individual.

38. The apparatus of claim 37, wherein said service comprises a virtual automatic teller machine (VATM) that emulates an ATM machine as it appears to the POS system.

39. The apparatus of claim 37, wherein a legally responsible party authorizes said financial institution to make transactions to their checking, savings, or credit/debit card accounts to fund said service account.

40. The apparatus of claim 38, wherein said third parties comprise merchant sites accessible via an electronic network.

41. The apparatus of claim 40, wherein said merchant sites may be accessed by said individual from a list of service approved merchant sites based upon selected factors that may include the individual's age and content of said merchant site.

42. The apparatus of claim 40, wherein said merchant sites may be accessed by said individual based upon a merchant profile approved by said individuals'parent or guardian.

43. The apparatus of claim 41, wherein service inspects a merchant site before it is added to said service's approved list.

44. The apparatus of claim 40, wherein said service can intercept a transaction and prevent a sale authorizing payment for a transaction from proceeding if a particular product/service or class of products/services is involved in said transaction between said individual and said merchant site.

45. The apparatus of claim 40, wherein said service provides said merchant with valid separate account information; and wherein said merchant can access said separate account pursuant to a transaction with said individual.

46. The apparatus of claim 40, wherein all transfers of funds and all transactions involving said individual are reconciled and reported to said individual and/or said individual's parent of guardian.

47. The apparatus of claim 40, wherein said service provides any of credit card, debit card, or ATM card information to said merchant as appropriate.

48. The apparatus of claim 40, wherein said service maintains a database of service members, as well as member profiles that may include any of such information as spending limits per transaction, types of products that may be purchased, and sources of funds.

49. The apparatus of claim 40, wherein said service authorizes transactions on behalf of said individual after verifying that funds are available in said separate account.

50. The apparatus of claim 40, further comprising:

a database for collecting information about said individual which may include any of said individual's purchase preferences, spending habits, dates of significance, and other relevant information; wherein said information may optionally be used by said individual with an on-line agent to assist said individual in finding desired products and services, or may be used to provide market information with regard to said individual's preferences and spending patterns.

51. The apparatus of claim 40, further comprising:
a pass-through remailer that directs all products ordered from merchants by said individual to said service, which then forwards said products to an intended recipient.

52. The apparatus of claim 37, wherein said service does not have custody of any funds within said separate account.

53. The apparatus of claim 37, wherein said service supervises said individual's use of said separate account as a surrogate for said individual's parent or guardian.

54. The apparatus of claim 37, wherein funds of each individual who uses said service are commingled in a single service account at said financial institution; and wherein access to said funds is segregated based on fund ownership records maintained in a service database.

55. An apparatus that allows a merchant to withdraw funds directly from an account of an individual lacking contractual capacity automatically at the time of purchase, comprising:
a service for providing said individual with access to one or more merchants, wherein said service does not hold any of said individual's finds; and
means within said service for enabling legally binding transactions between said individual and said merchant with said separate account by authorizing transactions between said individual and said merchant on behalf of said individual's parent or guardian.

56. The apparatus of claim 55, further comprising:
a pass phrase that is used to lookup a multiple digit PIN number in a service database.

57. The apparatus of claim 55, wherein said service generates a global gift certificate for use by said individual in concluding one or more transactions with said merchant.

58. The apparatus of claim 57, wherein said gift certificate is a universal gift certificate that may be given to anyone by said individual.

59. The apparatus of claim 55, wherein said funds may either be transferred from said fund source account to said separate account on a periodic basis as an allowance or on a one time basis as a gift.

60. The apparatus of claim 55, wherein said separate account is used as if it were a debit card, wherein said individual enters a certificate number into a form as if it were a standard debit card when said individual makes a purchase from said merchant.

61. The apparatus of claim 55, wherein said service screens merchants to maintain a list of approved merchants that are known to be reputable and that are known to carry only products and services that are appropriate for minors;
wherein said service may optionally provide subsets of said list and allow said individual's parent or guardian to set a profile for said individual, in which case said parent or guardian may be provided with a secure pass code that gives said parent or guardian supervisory access to said individual's account.

62. The apparatus of claim 55, wherein permission to use said separate account is granted to said individual by said individual's parent or guardian when establishing said separate account;
wherein said individual's parent or guardian provides said service with authority to execute and supervise transactions on behalf of said individual.

63. The apparatus of claim 55, wherein said individual's use of said separate account is limited to any of the scope of goods and services authorized by said individual's parent or guardian, a daily/weekly spending limit, maintaining a minimum account balance, or a limit on spending per session.

64. The apparatus of claim 55, wherein said individual's account privileges are automatically enforced by said service by matching a desired transaction to a profile established by said individual's parent or guardian.

65. The apparatus of claim 55, wherein said service provides bonus and promotional features that reward said individual for purchases.

66. The apparatus of claim 65, wherein said rewards may be issued as coupons in real time which are good for immediate discounts on certain merchandise, or they may be promotional discounts;
wherein said individual may optionally assign said rewards to third parties, or may convert said rewards to monetary value which is credited to said separate account.

67. The apparatus of claim 55, wherein said service, upon authorization, transfers said individual's account to said individual upon said individual reaching majority.

68. The apparatus of claim 55, wherein said service executes transactions between said individual and said merchant on a cash basis and does not allow said individual to become over-extended through the use of credit.

69. The apparatus of claim 55, wherein an option may be set in said individual's profile that allows a portion of said individual's funds to be placed into a savings account, a non-profit donation, or an investment fund.

70. The apparatus of claim 55, further comprising the step of:
a coupon that allows a merchant or other agency to distribute a physical coupon to said individual during a face-to-face transaction, wherein said coupon is redeemable for any of cash, funds deposited in said separate account, a deposit to a bank or credit card account, or a discount on purchases made as said service by said individual using said separate account.

71. The apparatus of claim 70, wherein said coupon is a contest ticket that requires said individual to log-on to said service to see if and what said individual has won;
wherein redemption of said coupon takes place at a service site;
wherein each said coupon is optionally identified by a number which can be traced back to a specific transaction or merchant; and
wherein said coupon optionally may only be redeemed once.

72. The apparatus of claim 55, wherein said transaction may be concluded between said individual and said merchant via any of telephone, fax, and mail based orders, as well as an in person transaction based upon a service card that is approved by said service.

* * * * *

UNITED STATES PATENT AND TRADEMARK OFFICE
CERTIFICATE OF CORRECTION

PATENT NO.     : 6,173,269 B1
DATED          : January 9, 2001
INVENTOR(S)    : Sokol et al.

It is certified that error appears in the above-identified patent and that said Letters Patent is hereby corrected as shown below:

<u>Title page,</u>
Item [75], Inventors, replace "Daniel David Solokl" with -- Daniel David Sokol --.

Signed and Sealed this

Tenth Day of May, 2005

JON W. DUDAS
*Director of the United States Patent and Trademark Office*